(12) United States Patent
Huault et al.

(10) Patent No.: US 12,351,491 B2
(45) Date of Patent: Jul. 8, 2025

(54) ELECTROLYSIS CELL FOR AN ELECTROLYTIC TREATMENT OF A LIQUID

(71) Applicant: POOL TECHNOLOGIE, Valergues (FR)

(72) Inventors: Jean-François Huault, Cérans-Foulletourte (FR); Nicolas Osanno, Saint Romain au Mont d'or (FR)

(73) Assignee: POOL TECHNOLOGIE, Valergues (FR)

( * ) Notice: Subject to any disclaimer, the term of this patent is extended or adjusted under 35 U.S.C. 154(b) by 783 days.

(21) Appl. No.: 17/431,124

(22) PCT Filed: Feb. 14, 2020

(86) PCT No.: PCT/FR2020/050275
§ 371 (c)(1),
(2) Date: Aug. 13, 2021

(87) PCT Pub. No.: WO2020/165548
PCT Pub. Date: Aug. 20, 2020

(65) Prior Publication Data
US 2022/0135447 A1   May 5, 2022

(30) Foreign Application Priority Data
Feb. 15, 2019   (FR) ..................... 19/01582

(51) Int. Cl.
*C02F 1/46*       (2023.01)
*C02F 1/461*      (2023.01)
(Continued)

(52) U.S. Cl.
CPC ........ *C02F 1/46104* (2013.01); *C02F 1/4674* (2013.01); *C02F 2001/46152* (2013.01);
(Continued)

(58) Field of Classification Search
CPC ...... C02F 1/46; C02F 1/32; C02F 1/44; C02F 1/34; C02F 1/42; C02F 1/30
See application file for complete search history.

(56) References Cited

U.S. PATENT DOCUMENTS 4,119,518 A   10/1978   Miller
4,946,574 A *  8/1990   Lin ..................... C02F 1/4618
                                                 210/103
(Continued)

FOREIGN PATENT DOCUMENTS

CA    1090292 A    11/1980
FR    2318115 A1    2/1977
JP    H0416284 A    1/1992

OTHER PUBLICATIONS

English Translation to International Search Report for Application No. PCT/FR2020/050275, Feb. 14, 2020.
(Continued)

*Primary Examiner* — Jennifer Dieterle
*Assistant Examiner* — Cameron J Allen
(74) *Attorney, Agent, or Firm* — CANTOR COLBURN LLP

(57) ABSTRACT

Electrolytic cell for an electrolytic treatment of a liquid, the electrolytic cell including a receptacle defining an electrolysis chamber; a first set of conductive plates, a second set of conductive plates, and a third set of conductive plates, which are arranged in the electrolysis chamber, the conductive plates of the first, second and third sets extending radially in relation to the longitudinal axis (A) of the receptacle; an electrical power source configured to supply electricity to the conductive plates of the first, second and third sets; a switching device configured to interrupt the electricity supply to the conductive plates of the first, second and third sets and to modify the electrical connection between the conductive plates of the first, second and third sets and positive
(Continued)

and negative terminals of the electrical power source; and a control unit configured to control the switching device according to an operating cycle.

20 Claims, 3 Drawing Sheets

(51) Int. Cl.
    *C02F 1/467*     (2023.01)
    *C02F 103/42*     (2006.01)
    *E04H 4/12*     (2006.01)

(52) U.S. Cl.
    CPC .. *C02F 2103/42* (2013.01); *C02F 2201/4613* (2013.01); *C02F 2201/4617* (2013.01); *E04H 4/1209* (2013.01)

(56) References Cited

U.S. PATENT DOCUMENTS

| | | | |
|---|---|---|---|
| 6,346,187 B1 * | 2/2002 | Tran | B82Y 30/00 |
| | | | 205/342 |
| 2018/0119295 A1 | 5/2018 | Griffis et al. | |

OTHER PUBLICATIONS

International Search Report for Application No. PCT/FR2020/050275, Feb. 14, 2020.

Written Opinion for Application No. PCT/FR2020/050275, Feb. 14, 2020.

* cited by examiner

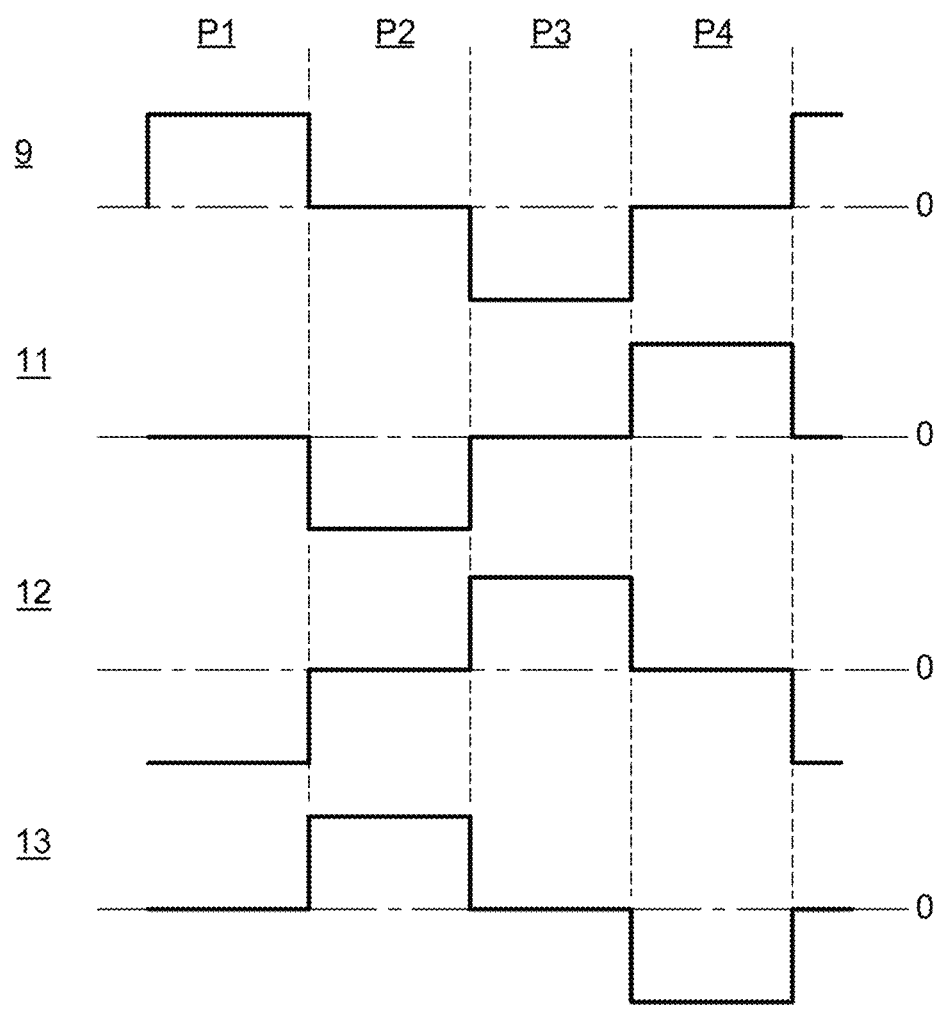

ELECTROLYSIS CELL FOR AN ELECTROLYTIC TREATMENT OF A LIQUID

CROSS REFERENCE TO RELATED APPLICATIONS

This application is a National Stage of PCT Application No. PCT/FR2020/050275 filed on Feb. 14, 2020, which claims priority to French Patent Application No. 19/01582 filed on Feb. 15, 2019, the contents each of which are incorporated herein by reference thereto.

TECHNICAL FIELD

The present invention concerns an electrolysis cell for an electrolytic treatment of a liquid, such as water.

BACKGROUND

An electrolysis cell for an electrolytic treatment of water originating from a basin, such as a swimming pool, includes in a known manner:
- a container delimiting an electrolysis chamber and including a liquid inlet and a liquid outlet which are fluidly connected to the electrolysis chamber, the container including a longitudinal axis which is substantially parallel to a direction of flow of the water to be treated through the electrolysis chamber,
- a source of an aqueous solution containing a chloride, such as sodium chloride, the source being fluidly connected to the liquid inlet of the container,
- a first set of electrodes and a second set of electrodes which are disposed in the electrolysis chamber and intended to be at least partially immersed in the water to be treated, each electrode of the second set being disposed between two electrodes of the first set,
- a set of conductive plates which are disposed in the electrolysis chamber and intended to be at least partially immersed in the water to be treated, each conductive plate being disposed between an electrode of the first set and an electrode of the second set and being kept electrically isolated from the electric power supply source,
- an electric power supply source including a positive terminal and a negative terminal to which each electrode of the first and second sets is adapted to be electrically connected, the electric power supply source being configured to electrically power the electrodes of the first and second sets,
- a switching device configured to interrupt the electric power supply of the electrodes of the first and second sets and to modify the electrical connection between the electrodes of the first and second sets and the positive and negative terminals of the electric power supply source so as to change the polarity of the electrodes of the first and second sets, and
- a controller configured to control the switching device according to an operating cycle during which each electrode of the first and second sets passes through several successive states according to a predetermined sequence including a connected state in which said electrode is at a first polarity, a non-connected state in which said electrode is electrically isolated from the electric power supply source, a connected state in which said electrode is at a second polarity opposite to the first polarity and a non-connected state in which said electrode is electrically isolated from the electric power supply source.

More particularly, the controller is configured to control the switching device such that when the electrodes of the first set are connected to the positive terminal of the electric power supply source then the electrodes of the second set are connected to the negative terminal of the electric power supply source, and such that when the electrodes of the second set are connected to the positive terminal of the electric power supply source then the electrodes of the first set are connected to the negative terminal of the electric power supply source.

Furthermore, the control unit is configured to control the switching device such that the electrodes of the first and second sets are simultaneously electrically isolated from the electric power supply source.

Such a configuration of the aforementioned electrolysis cell, and in particular the fact of performing regular inversions of the polarity of the electrodes, allows removing scale deposits on the electrodes which are detrimental to the proper operation of the electrolysis cell. In addition, the intermediate passage through a non-connected state between the establishment of two opposite polarities for the same electrode allows performing a less brutal polarity inversion and therefore reducing the wear of the electrodes.

Nonetheless, such a configuration of the electrolysis cell induces a premature wear of the electrodes in comparison with the conductive plates, and therefore a frequent replacement of the electrolysis cell.

BRIEF SUMMARY

The present invention aims at overcoming all or part of these drawbacks.

Hence, the technical problem at the origin of the invention consists in providing an electrolysis cell with a simple and economical structure, while having an extended service life.

To this end, the present invention concerns an electrolysis cell for an electrolytic treatment of a liquid, comprising at least:
- a container delimiting an electrolytic chamber and including a liquid inlet and a liquid outlet which are fluidly connected to the electrolysis chamber, the container including a longitudinal axis,
- a first set of conductive plates, a second set of conductive plates and a third set of conductive plates which are disposed in the electrolysis chamber and which are intended to be at least partially immersed in the liquid to be treated, each conductive plate of the second set being disposed between a conductive plate of the first set and a conductive plate of the third set, the conductive plates of the first, second and third sets being electrically-conductive and extending radially with respect to the longitudinal axis of the container,
- an electric power supply source including a positive terminal and a negative terminal to which each conductive plate of the first, second and third sets is adapted to be electrically connected, the electric power supply source being configured to electrically power the conductive plates of the first, second and third sets,
- a switching device configured to interrupt the electric power supply of the conductive plates of the first, second and third sets and to modify the electrical connection between the conductive plates of the first, second and third sets and the positive and negative terminals of the electric power supply source so as to change the polarity of the conductive plates of the first, second and third sets, and a controller configured to control the switching device according to an operating cycle during which each conductive plate of the first, second and third sets passes through several successive states according to a predetermined sequence including a connected state in which said conductive plate is at a first polarity, a non-conductive state in which said conductive plate is electrically isolated from the electric power supply source, a connected state in which said conductive plate is at a second polarity opposite to the first polarity and a non-connected state in which said conductive plate is electrically isolated from the electric power supply source, the controller being configured to control the switching device such that, during at least one operating phase of said operating cycle, the conductive plates of one of the first, second and third sets are electrically connected to the positive terminal of the electric power supply source, the conductive plates of one of the first, second and third sets are electrically connected to the negative terminal of the electric power supply source and the conductive plates of one of the first, second and third sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

In other words, the control unit is configured to control the switching device such that, during at least one operating phase of said operating cycle, the conductive plates of the first, second and third sets are kept in a configuration in which the conductive plates of one of the first, second and third sets are electrically connected to the positive terminal of the electric power supply source, the conductive plates of one of the first, second and third sets are electrically connected to the negative terminal of the electric power supply source and the conductive plates of one of the first, second and third sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

Such a configuration of the electrolysis cell, and in particular the fact that during at least one operating phase of the operating cycle and preferably during each operating phase of the operating cycle, the conductive plates of one of the sets of plates are electrically connected to the positive terminal of the electric power supply source, the conductive plates of one of the sets of plates are electrically connected to the negative terminal of the electric power supply source and the conductive plates of one of the sets of plates are electrically isolated from the electric power supply source, allows, on the one hand, distributing the wear over the entirety of the conductive plates, and no longer only over the electrodes and, on the other hand, ensuring a continuous operation of the electrolysis cell.

Thus, the specific configuration of the electrolysis cell according to the present invention substantially increases the treatment performances of the latter, and substantially reduces the frequency of maintenance or replacement of the electrolysis cell, which is very advantageous in particular due to the high manufacturing costs of the conductive plates.

Furthermore, the radial arrangement of the different conductive plates substantially increases the useful surfaces of each conductive plate, that is to say the surfaces of each conductive plate that participates to the electrolysis, which allows either reducing the size of the conductive plates and therefore the manufacturing costs of the electrolysis cell, or increasing the performances of the electrolysis cell.

The electrolysis cell may further present one or more of the following features, considered separately or in combination.

According to an embodiment of the invention, the controller is configured to control the switching device such that, during each operating phase of said operating cycle, each conductive plate of the first, second and third sets is kept in a state different from the state in which said conductive plate was during the previous operating phase.

In other words, the controller is configured to control the switching device such that, at each operating phase of said operating cycle and for each set of plates, the polarity of the conductive plates of the same set of plates is different from the polarity of said conductive plates during the previous operating phase.

According to an embodiment of the invention, the longitudinal axis of the container is substantially parallel to a direction of flow of the liquid to be treated through the electrolysis chamber.

According to an embodiment of the invention, the operating cycle includes a plurality of successive operating phases.

According to an embodiment of the invention, the different operating phases of the operating cycle have substantially identical operating durations.

According to an embodiment of the invention, the controller is configured to control the switching device such that, during each operating phase of said operating cycle, the conductive plates of one of the first, second and third sets are electrically connected to the positive terminal of the electric power supply source, the conductive plates of one of the first, second and third sets are electrically connected to the negative terminal of the electric power supply source and the conductive plates of one of the first, second and third sets are electrically isolated from the electric power supply source.

According to an embodiment of the invention, the electrolysis cell further includes a fourth set of conductive plates, each conductive plate of the fourth set being disposed between a conductive plate of the third set and a conductive plate of the first set, the conductive plates of the fourth set being electrically-conductive and extending radially with respect to the longitudinal axis of the container.

According to an embodiment of the invention, the controller is configured to control the switching device such that, during the operating cycle, each conductive plate of the fourth set passes through several successive states according to a predetermined sequence including a connected state in which said conductive plate is at a first polarity, a non-connected state in which said conductive plate is electrically isolated from the electric power supply source, a connected state in which said conductive plate is at a second polarity opposite to the first polarity and a non-connected state in which said conductive plate is electrically isolated from the electric power supply source, and such that, during at least one operating phase of said operating cycle, the conductive plates of one of the first, second, third and fourth sets are electrically connected to the positive terminal of the electric power supply source, the conductive plates of one of the first, second, third and fourth sets are electrically connected to the negative terminal of the electric power supply source, and the conductive plates of the other ones of the first, second, third and fourth sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

According to an embodiment of the invention, the controller is configured to control the switching device such that, during each operating phase of said operating cycle, the conductive plates of one of the first, second, third and fourth sets are electrically connected to the positive terminal of the electric power supply source, the conductive plates of one of the first, second, third and fourth sets are electrically connected to the negative terminal of the electric power supply source, and the conductive plates of the other ones amongst the first, second, third and fourth sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

According to an embodiment of the invention, the controller is configured to control the switching device such that the operating cycle includes:

a first operating phase during which the switching device connects the conductive plates of the first set to the positive terminal of the electric power supply source, isolates the conductive plates of the second set from the electric power supply source, connects the conductive plates of the third set to the negative terminal of the electric power supply source, and isolates the conductive plates of the fourth set from the electric power supply source, a second operating phase during which the switching device isolates the conductive plates of the first set from the electric power supply source, connects the conductive plates of the second set to the negative terminal of the electric power supply source, isolates the conductive plates of the third set from the electric power supply source, and connects the conductive plates of the fourth set to the positive terminal of the electric power supply source, a third operating phase during which the switching device connects the conductive plates of the first set to the negative terminal of the electric power supply source, isolates the conductive plates of the second set from the electric power supply source, connects the conductive plates of the third set to the positive terminal of the electric power supply source, and isolates the conductive plates of the fourth set from the electric power supply source, and a fourth operating phase during which the switching device isolates the conductive plates of the first set from the electric power supply source, connects the conductive plates of the second set to the positive terminal of the electric power supply source, isolates the conductive plates of the third set from the electric power supply source, and connects the conductive plates of the fourth set to the negative terminal of the electric power supply source.

In other words, the controller unit is configured to control the switching device such that:

during a first operating phase of the operating cycle, the conductive plates of the first, second, third and fourth sets are kept in a first configuration in which the conductive plates of the first set are connected to the positive terminal of the electric power supply source, the conductive plates of the second set are isolated from the electric power supply source, the conductive plates of the third set are connected to the negative terminal of the electric power supply source, and the conductive plates of the fourth set are isolated from the electric power supply source, during a second operating phase of the operating cycle, the conductive plates of the first, second, third and fourth sets are kept in a second configuration in which the conductive plates of the first set are isolated from the electric power supply source, the conductive plates of the second set are connected to the negative terminal of the electric power supply source, the conductive plates of the first set are isolated from the electric power supply source, the conductive plates of the fourth set are connected to the positive terminal of the electric power supply source, during a third operating phase of the operating cycle, the conductive plates of the first, second, third and fourth sets are kept in a third configuration in which the conductive plates of the first set are connected to the negative terminal of the electric power supply source, the conductive plates of the second set are isolated from the electric power supply source, the conductive plates of the third set are connected to the positive terminal of the electric power supply source, and the conductive plates of the fourth set are isolated from the electric power supply source, and during a fourth operating phase of the operating cycle, the conductive plates of the first, second, third and fourth sets are kept in a fourth configuration in which the conductive plates of the first set are isolated from the electric power supply source, the conductive plates of the second set are connected to the positive terminal of the electric power supply source, the conductive plates of the third set are isolated from the electric power supply source, and the conductive plates of the fourth set are connected to the negative terminal of the electric power supply source.

Advantageously, the first, second, third and fourth operating phases have substantially identical durations of operation.

According to an embodiment of the invention, the operating cycle includes a repetition of the first, second, third and fourth operating phases.

According to an embodiment of the invention, the electric power supply source is a voltage source or a current source. For example, the electric power supply source may be a current generator or a voltage generator, or an electric battery.

According to an embodiment of the invention, each of the first, second and third sets includes an even number of conductive plates.

According to an embodiment of the invention, each of the first, second, third and fourth sets includes an even number of conductive plates. For example, each of the first, second, third and fourth sets may include between four and twelve conductive plates, and for example eight conductive plates.

According to an embodiment of the invention, each conductive plate includes a titanium core and a coating layer covering the respective core.

According to an embodiment of the invention, the coating layer of each conductive plate is made of ruthenium.

According to an embodiment of the invention, each conductive plate extends substantially parallel to the longitudinal axis of the container.

According to an embodiment of the invention, the container has a generally cylindrical shape.

According to an embodiment of the invention, the liquid outlet is located opposite to the liquid inlet.

According to an embodiment of the invention, the electrolysis cell includes a support disposed in the electrolysis chamber, the support including a first end portion directed towards the liquid inlet, a second end portion directed towards the liquid outlet and an intermediate portion located between the first and second end portions, the conductive plates of the first, second and third sets, and where appropriate also the fourth set, being fastened to the intermediate portion of the support.

According to an embodiment of the invention, the support is made of an electrically-insulating material.

According to an embodiment of the invention, the first end portion has a cross-section which decreases in the direction of an end of the support directed towards the liquid inlet. These arrangements allow distributing the liquid stream even more homogeneously along the different conductive plates.

According to an embodiment of the invention, the first end portion has an ogive-like general shape. These arrangements allow distributing the liquid stream even more homogeneously along the different conductive plates.

According to an embodiment of the invention, the second end portion has a cross-section which decreases in the direction of one end of the support directed towards the liquid outlet. Advantageously, the second end portion has an ogive-like general shape.

According to an embodiment of the invention, each conductive plate has an axial length smaller than the axial length of the support.

According to an embodiment of the invention, the container is an open container.

According to an embodiment of the invention, the electrolysis cell further includes a chloride source fluidly connected to the liquid inlet of the container. For example, the chloride source is configured to supply the container with an aqueous solution containing a chloride, such as sodium chloride.

According to an embodiment of the invention, the electrolysis cell is an electrolysis cell for an electrolytic treatment of water originating from a basin, such as a swimming pool.

According to an embodiment of the invention, the container is made of a transparent or translucent material.

According to an embodiment of the invention, the conductive plates of the different sets of plates are spaced apart from one another.

According to an embodiment of the invention, the conductive plates of the same set of plates are electrically connected to one another.

According to an embodiment of the invention, the electrolysis cell comprises a plurality of electrically-conductive tracks extending around the different conductive plates and around the longitudinal axis of the container, each of the electrically-conductive tracks connecting the conductive plates of the same set of plates to one another.

According to the embodiment represented in the figures, the electrolysis cell comprises a plurality of connecting elements which project from the container, each connecting element being electrically connected to one of the electrically-conductive track.

According to an embodiment of the invention, the conductive plates of the same set of plates are electrically isolated from the conductive plates of the other sets of plates.

The present invention further concerns a method for electrolytic treatment of a liquid with an electrolysis cell, the treatment method comprising the following steps of:

providing a container delimiting an electrolysis chamber and including a liquid inlet and a liquid outlet which are fluidly connected to the electrolysis chamber, the container including a longitudinal axis which is substantially parallel to a direction of flow of the liquid to be treated through the electrolysis chamber, the container containing a first set of conductive plates, a second set of conductive plates and a third set of conductive plates which are disposed in the electrolysis chamber and which are intended to be at least partially immersed in the liquid to be treated, each conductive plate of the second set being disposed between a conductive plate of the first set and a conductive plate of the third set, the conductive plates of the first, second and third sets being electrically-conductive and extending radially with respect to the longitudinal axis of the container, providing an electric power supply source including a positive terminal and a negative terminal to which each conductive plate of the first, second and third sets is adapted to be electrically connected, the electric power supply source being configured to electrically power the conductive plates of the first, second and third sets, providing a switching device configured to interrupt the electric power supply of the conductive plates of the first, second and third sets and to modify the electrical connection between the conductive plates of the first, second and third sets and the positive and negative terminals of the electric power supply source so as to change the polarity of the conductive plates of the first, second and third sets, and controlling the switching device according to an operating cycle during which each conductive plate of the first, second and third sets passes through several successive states according to a predetermined sequence including a connected state in which said conductive plate is at a first polarity, a non-connected state in which said conductive plate is electrically isolated from the electric power supply source, a connected state in which said conductive plate is at a second polarity opposite to the first polarity and a non-connected state in which said conductive plate is electrically isolated from the electric power supply source, the controlling step consisting in controlling the switching device such that, during at least one operating phase of said operating cycle, the conductive plates of one of the first, second and third sets are electrically connected to the positive terminal of the electric power supply source, the conductive plates of one of the first, second and third sets are electrically connected to the negative terminal of the electric power supply source and the conductive plates of one of the first, second and third sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

BRIEF DESCRIPTION OF THE DRAWINGS

In any case, the invention will be better understood from the following description with reference to the appended schematic drawings representing, as a non-limiting example, an embodiment of this electrolysis cell.

FIG. 5 is a diagram representing the variation as a function of time of the polarity of conductive plates of different sets of plates of the electrolysis cell of FIG. 1.

DETAILED DESCRIPTION

Figure 1:
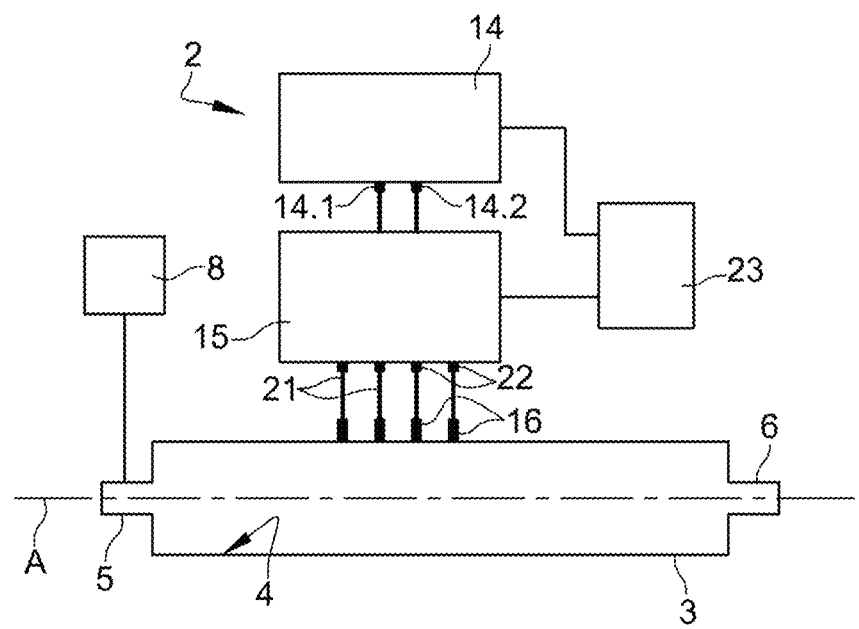
FIG. 1 is a schematic view of an electrolysis cell according to the invention.

FIGS. 1 to 4 represent an electrolysis cell 2 for an electrolytic treatment of a liquid, such as water of a basin, and for example a swimming pool. More particularly, the electrolysis cell 2 is configured for a treatment by chlorination of a basin's water.

The electrolysis cell 2 comprises a container 3, also called case, delimiting an electrolysis chamber 4 and including a liquid inlet 5 and a liquid outlet 6 which are fluidly connected to the electrolysis chamber 4. Advantageously, the container 3 includes a longitudinal axis A which is substantially parallel to a direction of flow of the liquid to be treated through the electrolysis chamber 4.

According to the embodiment represented in the figures, the container 3 has a generally cylindrical shape, and the liquid inlet 5 and the liquid outlet 6 are disposed opposite one another. For example, the container 3 may be made of a transparent or translucent material.

The electrolysis cell 2 also comprises a support 7 disposed in the electrolysis chamber 4. Advantageously, the support 7 is made of an electrically-insulating material. The support 7 includes a first end portion 7.1 directed towards the liquid inlet 5, a second end portion 7.2 directed towards the liquid outlet 6 and an intermediate portion 7.3 located between the first and second end portions 7.1, 7.2.

Advantageously, the first end portion 7.1 has a cross-section which decreases in the direction of one end of the support 7 directed towards the liquid inlet 5, and the second end portion 7.2 has a cross-section which decreases in the direction of one end of the support 7 directed towards the liquid outlet 6. According to the embodiment represented in the figures, each of the first and second end portions 7.1, 7.2 has an ogive-like general shape.

The electrolysis cell 2 further includes a chloride source 8 fluidly connected to the liquid inlet 5 of the container 3. For example, the chloride source 8 is configured to supply the container 3 with an aqueous solution containing a chloride, such as sodium chloride.

In addition, the electrolysis cell 2 comprises a first set of conductive plates 9, a second set of conductive plates 11, a third set of conductive plates 12 and a fourth set of conductive plates 13 disposed in the electrolysis chamber 4 and intended to be at least partially immersed in the liquid to be treated. According to the embodiment represented in the figures, each conductive plate of the first, second, third and fourth sets has an axial length smaller than the axial length of the support 7, and for example of the intermediate portion 7.3.

The conductive plates 9, 11, 12, 13 of the first, second, third and fourth sets are fastened to the intermediate portion 7.3 of the support 7 and extend radially with respect to the longitudinal axis A of the container 3. The conductive plates 9, 11, 12, 13 of the first, second, third and fourth sets are electrically-conductive, and the conductive plates of the same set are electrically connected to one another. Advantageously, the conductive plates 9, 11, 12, 13 of the first, second, third and fourth sets are spaced apart from one another.

Figure 2:
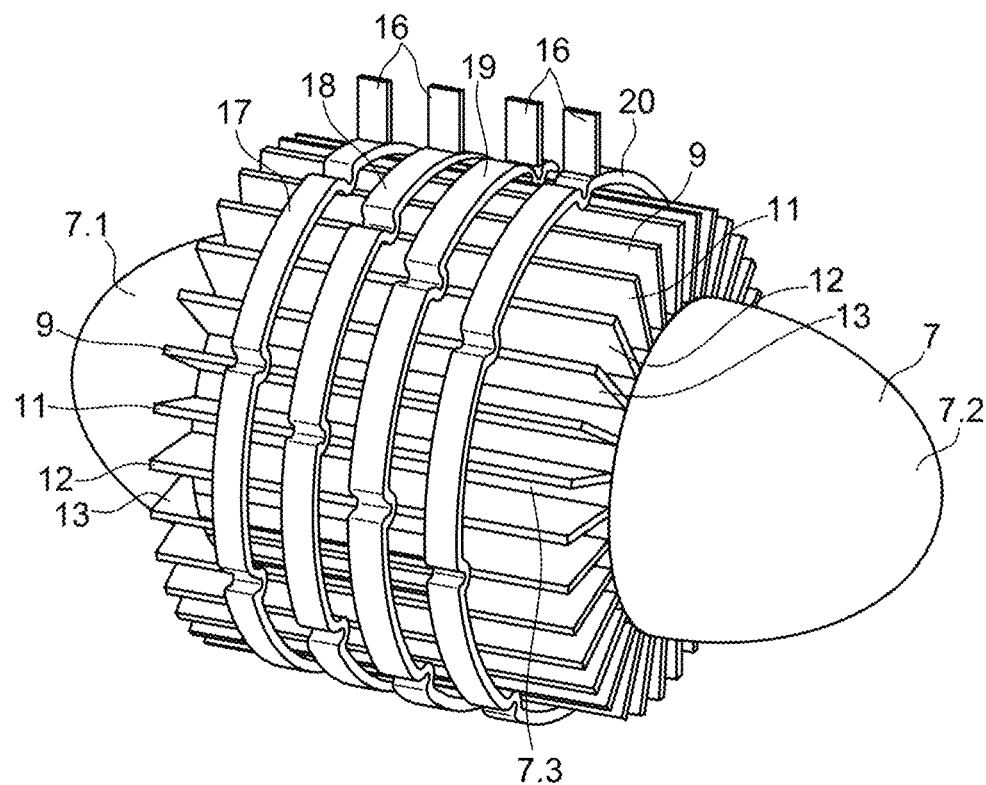
FIG. 2 is a partial perspective view of the electrolysis cell of FIG. 1.
Figure 3:
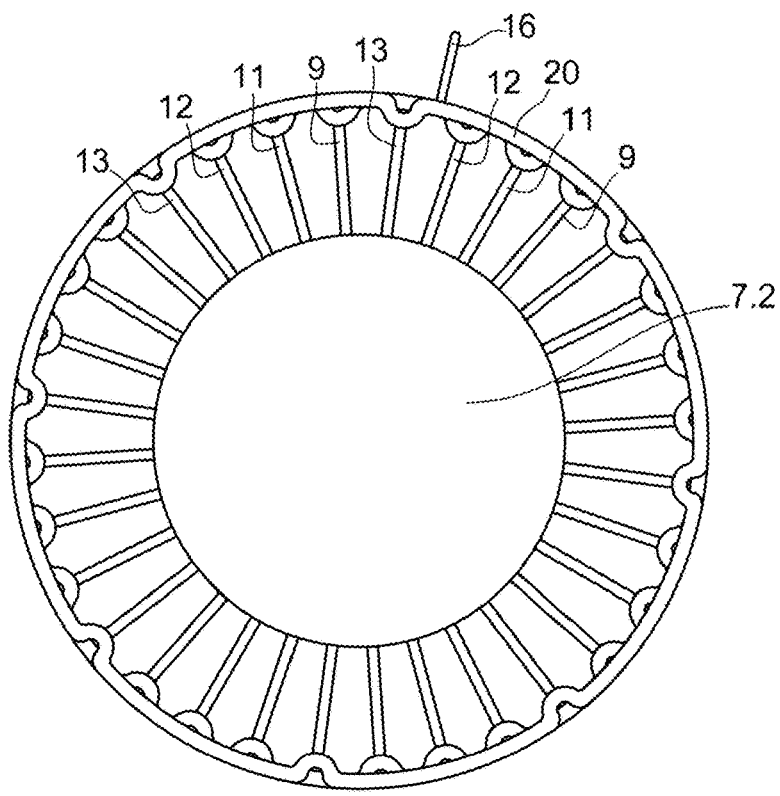
FIG. 3 is a partial front view of the electrolysis cell of FIG. 1.
Figure 4:
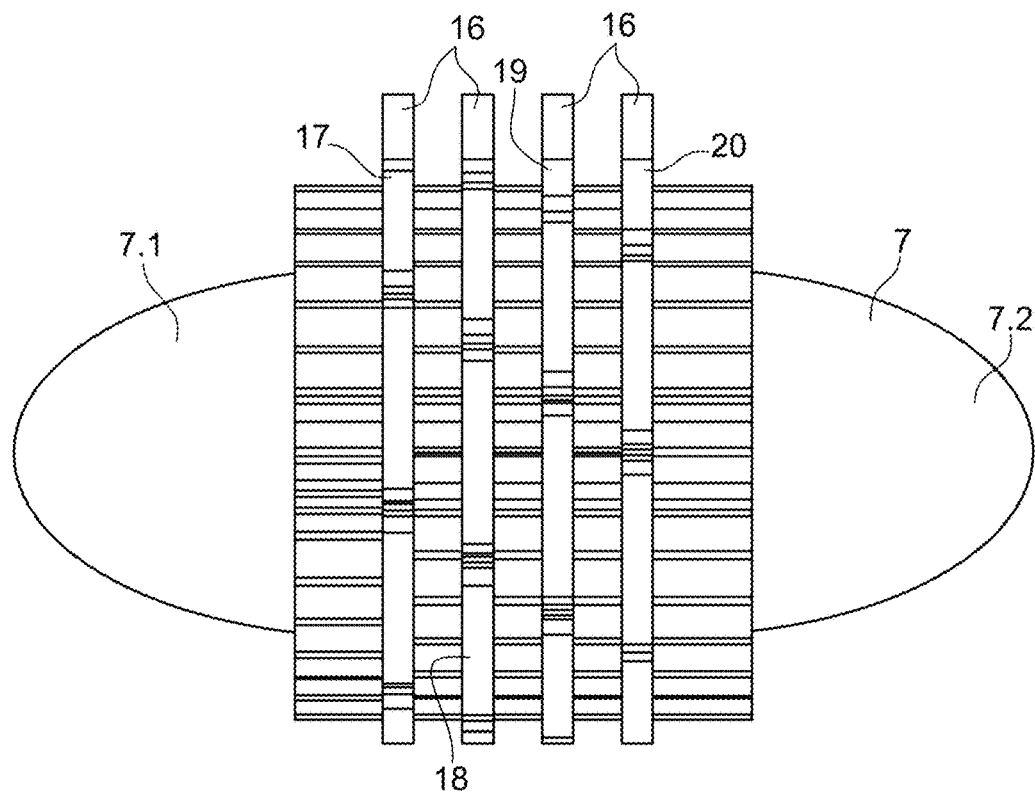
FIG. 4 is a partial side view of the electrolysis cell of FIG. 1.

As shown more particularly in FIGS. 2 and 3, each conductive plate 11 of the second set is disposed between a conductive plate 9 of the first set and a conductive plate 12 of the third set, and each conductive plate 13 of the fourth set is disposed between a conductive plate 12 of the third set and a conductive plate 9 of the first set.

Advantageously, the different conductive plates 9, 11, 12, 13 are evenly distributed around the longitudinal axis A of the container. According to an embodiment of the invention, each conductive plate 9, 11, 12, 13 of the first, second, third and fourth sets includes a titanium core and a coating layer, for example made of ruthenium, covering the respective core.

The electrolysis cell 2 further comprises an electric power supply source 14 including a positive terminal 14.1 and a negative terminal 14.2 to which each conductive plate of the first, second, third an fourth sets is adapted to be electrically connected. Thus, the electric power supply source 14 is configured to electrically power the conductive plates of the first, second, third and fourth sets.

In addition, the electrolysis cell 2 comprises a switching device 15 electrically connected to the electric power supply source 14 and configured, on the one hand, to interrupt the electric power supply of the conductive plates 9, 11, 12, 13 of the first, second, third and fourth sets and, on the other hand, to modify the electrical connection between the conductive plates 9, 11, 12, 133 of the first, second, third and fourth sets and the positive and negative terminals 14.1, 14.2 of the electric power supply source 14 so as to change the polarity of the conductive plates of the first, second, third and fourth sets during the operation of the electrolysis cell 2.

According to the embodiment represented in the figures, the electrolysis cell 2 comprises four connecting elements 16, such as connecting pins or connecting tabs, which project from the container 3 and each of which is electrically connected to the conductive plates of a respective one amongst the first, second, third and fourth sets via electrically-conductive tracks 17, 18, 19, 20 extending around the different conductive plates, and four connecting wires 21, each of which is electrically connected, on the one hand, to a respective output terminal 22 of the switching device 15 and, on the other hand, to a respective connecting element 16.

The electrolysis cell 2 also comprises a controller 23 which is, for example, equipped with a microprocessor. The controller 23 is configured to control the switching device 15 according to an operating cycle during which each conductive plate 9, 11, 12, 13 of the first, second, third and fourth sets passes through several successive states according to a predetermined sequence including a connected state in which said conductive plate is at a first polarity, a non-connected state in which said conductive plate is electrically isolated from the electric power supply source 14, a connected state in which said conductive plate is at a second polarity opposite to the first polarity and a non-connected state in which said conductive plate is again electrically isolated from the electric power supply source 14.

More particularly, the controller 23 is configured to control the switching device 15 such that, during each operating phase of said operating cycle, the conductive plates of one of the first, second, third and fourth sets are electrically connected to the positive terminal 14.1 of the electric power supply source 14, the conductive plates of one of the first, second, third and fourth sets are electrically connected to the negative terminal 14.2 of the electric power supply source 14 and the conductive plates of the two other sets are electrically isolated from the electric power supply source 14. During each operating phase of the operating cycle, each conductive plate that is electrically isolated from the electric power supply source 14 is disposed between a conductive plate electrically connected to the negative terminal 14.2 of the electric power supply source 14 and a conductive plate electrically connected to the positive terminal 14.1 of the electric power supply source 14.

According to an embodiment of the invention represented in FIG. 5, the controller 23 is configured to control the switching device 14 such that the operating cycle includes:
- a first operating phase P1 during which the switching device 15 connects the conductive plates 9 of the first set to the positive terminal 14.1 of the electric power supply source 14, isolates the conductive plates 11 of the second set from the electric power supply source 14, connects the conductive plates 12 of the third set to the negative terminal 14.2 of the electric power supply source 14, and isolates the conductive plates 13 of the fourth set from the electric power supply source 14,
- a second operating phase P2 during which the switching device 15 isolates the conductive plates 9 of the first set from the electric power supply source 14, connects the conductive plates 11 of the second set to the negative terminal 14.2 of the electric power supply source 14, isolates the conductive plates 12 of the third set from the electric power supply source 14, and connects the conductive plates 13 of the fourth set to the positive terminal 14.1 of the electric power supply source 14,
- a third operating phase P3 during which the switching device 15 connects the conductive plates 9 of the first set to the negative terminal 14.2 of the electric power supply source 14, isolates the conductive plates 11 of the second set from the electric power supply source 14, connects the conductive plates 12 of the third set to the positive terminal 14.1 of the electric power supply source 14, and isolates the conductive plates 13 of the fourth set from the electric power supply source 14, and
- a fourth operating phase P4 during which the switching device 15 isolates the conductive plates 9 of the first set from the electric power supply source 14, connects the conductive plates 11 of the second set to the positive terminal 14.2 of the electric power supply source 14, isolates the conductive plates 12 of the third set from the electric power supply source 14, and connects the conductive plates 13 of the fourth set to the negative terminal 14.2 of the electric power supply source 14.

Advantageously, the operating cycle includes a repetition of the aforementioned first, second, third and fourth operating phases P1 to P4.

Such a configuration of the electrolysis cell 2, and in particular the fact that during each operating phase of the operating cycle, the conductive plates of one of the sets of plates are electrically connected to the positive terminal 14.1 of the electric power supply source 14, the conductive plates of one of the sets of plates are electrically connected to the negative terminal 14.2 of the electric power supply source and the conductive plates of the two other sets of plates are electrically isolated from the electric power supply source 14, allows distributing the wear of the electrolysis cell over all of the conductive plates, and no longer only over the electrodes as is the case for the electrolysis cells of the prior art. Thus, the configuration of the electrolysis cell 2 according to the present invention reduces the frequency of maintenance or replacement of the electrolysis cell, which is very advantageous in particular due to the high manufacturing costs of the conductive plates.

Furthermore, the radial arrangement of the different conductive plates substantially increases the useful surfaces of each conductive plate, that is to say the surfaces of each conductive plate that participates to the electrolysis, which allows either reducing the size of the conductive plates and therefore the manufacturing costs of the electrolysis cell 2, or increasing the performances of the electrolysis cell.

It goes without saying that the invention is not limited to the sole embodiment of this electrolysis cell, described hereinabove as example, it encompasses, on the contrary, all variants thereof.

The invention claimed is:

1. An electrolysis cell for an electrolytic treatment of a liquid, comprising at least:
   a container delimiting an electrolytic chamber and including a liquid inlet and a liquid outlet which are fluidly connected to the electrolysis chamber, the container including a longitudinal axis,
   a first set of conductive plates, a second set of conductive plates and a third set of conductive plates which are disposed in the electrolysis chamber and which are intended to be at least partially immersed in the liquid to be treated, each conductive plate of the second set of conductive plates being disposed between a conductive plate of the first set of conductive plates and a conductive plate of the third set of conductive plates, the conductive plates of the first, second and third sets being electrically-conductive and extending radially with respect to the longitudinal axis of the container,
   an electric power supply source including a positive terminal and a negative terminal to which each conductive plate of the first, second and third sets of conductive plates is adapted to be electrically connected, the electric power supply source being configured to electrically power the conductive plates of the first, second and third sets of conductive plates,
   a switching device configured to interrupt the electric power of the conductive plates of the first, second and third sets of conductive plates and to modify an electrical connection between the conductive plates of the first, second and third sets of conductive plates and the positive and negative terminals of the electric power supply source so as to change a polarity of the conductive plates of the first, second and third sets of conductive plates, and
   a controller configured to control the switching device according to an operating cycle during which each conductive plate of the first, second and third sets of conductive plates passes through successive states according to a predetermined sequence, the successive states including a connected state in which each conductive plate of the first, second and third sets of conductive plates is at a first polarity, a non-conductive state in which each conductive plate of the first, second and third sets of conductive plates is electrically isolated from the electric power supply source, a connected state in which each conductive plate of the first, second and third sets of conductive plates is at a second polarity opposite to the first polarity and a non-connected state in which each conductive plate of the first, second and third sets of conductive plates is electrically isolated from the electric power supply source, the controller being configured to control the switching device such that, during at least one operating phase of the operating cycle, the conductive plates of one of the first, second and third sets are electrically connected to the positive terminal of the electric power supply source, the conductive plates of one of the first, second and third sets of conductive plates are electrically connected to the negative terminal of the electric power supply source and the conductive plates of one of the first, second and third sets of conductive plates are electrically isolated from the electric power supply source, each conductive plate of one of the first, second and third sets of conductive plates electrically isolated from the electric power supply source being disposed between a conductive plate electrically connected to the negative terminal of the electric power supply source and a conductive plate electrically connected to the positive terminal of the electric power supply source.

2. The electrolysis cell according to claim 1, wherein the controller is configured to control the switching device such that, during each operating phase of said operating cycle, the conductive plates of one of the first, second and third sets of conductive plates are electrically connected to the positive terminal of the electric power supply source, the conductive plates of one of the first, second and third sets of conductive plates are electrically connected to the negative terminal of the electric power supply source and the conductive plates of one of the first, second and third sets of conductive plates are electrically isolated from the electric power supply source.

3. The electrolysis cell according to claim 2, wherein the operating cycle includes a plurality of successive operating phases which have substantially identical operating durations.

4. The electrolysis cell according to claim 3, which further includes a fourth set of conductive plates, each conductive plate of the fourth set of conductive plates being disposed between a conductive plate of the third set of conductive plates and a conductive plate of the first set of conductive plates, the conductive plates of the fourth set of conductive plates being electrically-conductive and extending radially with respect to the longitudinal axis of the container.

5. The electrolysis cell according to claim 4, wherein the controller is configured to control the switching device such that, during the operating cycle, each conductive plate of the fourth set of conductive plates passes through successive states according to a predetermined sequence, the successive states including a connected state in which each conductive plate of the fourth set of conductive plates is at a first polarity, a non-connected state in which said conductive plate is electrically isolated from the electric power supply source, a connected state in which each conductive plate of the fourth set of conductive plates is at a second polarity opposite to the first polarity and a non-connected state in which each conductive plate of the fourth set of conductive plates is electrically isolated from the electric power supply source, and such that, during at least one operating phase of the operating cycle, the conductive plates of one of the first, second, third and fourth sets are electrically connected to the positive terminal of the electric power supply source, the conductive plates of one of the first, second, third and fourth sets are electrically connected to the negative terminal of the electric power supply source, and the conductive plates of other ones of the first, second, third and fourth sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

6. The electrolysis cell according to claim 5, wherein the controller is configured to control the switching device such that the operating cycle includes:

a first operating phase during which the switching device connects the conductive plates of the first set of conductive plates to the positive terminal of the electric power supply source, isolates the conductive plates of the second set of conductive plates from the electric power supply source, connects the conductive plates of the third set of conductive plates to the negative terminal of the electric power supply source, and isolates the conductive plates of the fourth set of conductive plates from the electric power supply source, a second operating phase during which the switching device isolates the conductive plates of the first set of conductive plates from the electric power supply source, connects the conductive plates of the second set of conductive plates to the negative terminal of the electric power supply source, isolates the conductive plates of the third set of conductive plates from the electric power supply source, and connects the conductive plates of the fourth set of conductive plates to the positive terminal of the electric power supply source, a third operating phase during which the switching device connects the conductive plates of the first set of conductive plates to the negative terminal of the electric power supply source, isolates the conductive plates of the second set of conductive plates from the electric power supply source, connects the conductive plates of the third set of conductive plates to the positive terminal of the electric power supply source, and isolates the conductive plates of the fourth set of conductive plates from the electric power supply source, and a fourth operating phase during which the switching device isolates the conductive plates of the first set of conductive plates from the electric power supply source, connects the conductive plates of the second set of conductive plates to the positive terminal of the electric power supply source, isolates the conductive plates of the third set of conductive plates from the electric power supply source, and connects the conductive plates of the fourth set of conductive plates to the negative terminal of the electric power supply source.

7. The electrolysis cell according to claim 6, wherein the operating cycle includes a repetition of the first, second, third and fourth operating phases.

8. The electrolysis cell according to claim 1, wherein the operating cycle includes a plurality of successive operating phases which have substantially identical operating durations.

9. The electrolysis cell according to claim 1, which further includes a fourth set of conductive plates, each conductive plate of the fourth set of conductive plates being disposed between a conductive plate of the third set of conductive plates and a conductive plate of the first set of conductive plates, the conductive plates of the fourth set of conductive plates being electrically-conductive and extending radially with respect to the longitudinal axis of the container.

10. The electrolysis cell according to claim 9, wherein the controller is configured to control the switching device such that, during the operating cycle, each conductive plate of the fourth set of conductive plates passes through successive states according to a predetermined sequence, the successive states including a connected state in which said conductive plate is at a first polarity, a non-connected state in which each conductive plate of the fourth set of conductive plates is electrically isolated from the electric power supply source, a connected state in which each conductive plate of the fourth set of conductive plates is at a second polarity opposite to the first polarity and a non-connected state in which each conductive plate of the fourth set of conductive plates is electrically isolated from the electric power supply source, and such that, during at least one operating phase of the operating cycle, the conductive plates of one of the first, second, third and fourth sets are electrically connected to the positive terminal of the electric power supply source, the conductive plates of one of the first, second, third and fourth sets are electrically connected to the negative terminal of the electric power supply source, and the conductive plates of other ones of the first, second, third and fourth sets are electrically isolated from the electric power supply source, each conductive plate electrically isolated from the electric power supply source being disposed between a conductive plate electrically connected to the negative terminal of the electric power supply source and a conductive plate electrically connected to the positive terminal of the electric power supply source.

11. The electrolysis cell according to claim 9, wherein the controller is configured to control the switching device such that the operating cycle includes:
- a first operating phase during which the switching device connects the conductive plates of the first set of conductive plates to the positive terminal of the electric power supply source, isolates the conductive plates of the second set of conductive plates from the electric power supply source, connects the conductive plates of the third set of conductive plates to the negative terminal of the electric power supply source, and isolates the conductive plates of the fourth set of conductive plates from the electric power supply source,
- a second operating phase during which the switching device isolates the conductive plates of the first set of conductive plates from the electric power supply source, connects the conductive plates of the second set of conductive plates to the negative terminal of the electric power supply source, isolates the conductive plates of the third set of conductive plates from the electric power supply source, and connects the conductive plates of the fourth set of conductive plates to the positive terminal of the electric power supply source,
- a third operating phase during which the switching device connects the conductive plates of the first set of conductive plates to the negative terminal of the electric power supply source, isolates the conductive plates of the second set of conductive plates from the electric power supply source, connects the conductive plates of the third set of conductive plates to the positive terminal of the electric power supply source, and isolates the conductive plates of the fourth set of conductive plates from the electric power supply source, and
- a fourth operating phase during which the switching device isolates the conductive plates of the first set of conductive plates from the electric power supply source, connects the conductive plates of the second set of conductive plates to the positive terminal of the electric power supply source, isolates the conductive plates of the third set of conductive plates from the electric power supply source, and connects the conductive plates of the fourth set of conductive plates to the negative terminal of the electric power supply source.

12. The electrolysis cell according to claim 11, wherein the operating cycle includes a repetition of the first, second, third and fourth operating phases.

13. The electrolysis cell according to claim 1, wherein the electric power supply source is an electric generator.

14. The electrolysis cell according to claim 1, wherein each of the first, second and third sets of conductive plates includes an even number of conductive plates.

15. The electrolysis cell according to claim 1, wherein each conductive plate of the first, second and third sets of conductive plates includes a titanium core and a coating layer covering the respective core.

16. The electrolysis cell according to claim 1, which includes a support disposed in the electrolysis chamber, the support including a first end portion directed towards the liquid inlet, a second end portion directed towards the liquid outlet and an intermediate portion located between the first and second end portions, the conductive plates of the first, second and third sets of conductive plates being fastened to the intermediate portion of the support.

17. The electrolysis cell according to claim 16, wherein the first end portion has a cross-section which decreases in a direction of an end of the support directed towards the liquid inlet.

18. The electrolysis cell according to claim 16, wherein the first end portion has an ogive-like general shape.

19. The electrolysis cell according to claim 1, which further includes a chloride source fluidly connected to the liquid inlet of the container.

20. A method for electrolytic treatment of a liquid with an electrolysis cell according to claim 1.

* * * * *